United States Patent
Park et al.

(10) Patent No.: US 11,994,995 B2
(45) Date of Patent: May 28, 2024

(54) PREFETCHING OPERATIONS IN STORAGE DEVICES

(71) Applicant: Samsung Electronics Co., Ltd., Suwon-si (KR)

(72) Inventors: Heekwon Park, Cupertino, CA (US); Ho bin Lee, San Jose, CA (US); Ilgu Hong, Santa Clara, CA (US); Yang Seok Ki, Palo Alto, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 17/740,219

(22) Filed: May 9, 2022

(65) Prior Publication Data

US 2022/0365878 A1 Nov. 17, 2022

Related U.S. Application Data (63) Continuation of application No. 16/887,567, filed on May 29, 2020, now Pat. No. 11,327,891.

(60) Provisional application No. 62/903,642, filed on Sep. 20, 2019.

(51) Int. Cl.
*G06F 12/0862* (2016.01)
*G06F 16/23* (2019.01)

(52) U.S. Cl.
CPC ...... *G06F 12/0862* (2013.01); *G06F 16/2379* (2019.01); *G06F 2212/602* (2013.01); *G06F 2212/6022* (2013.01)

(58) Field of Classification Search
CPC ........... G06F 12/0862; G06F 2212/602; G06F 2212/6022; G06F 16/2379
See application file for complete search history.

(56) References Cited

U.S. PATENT DOCUMENTS

| | | | |
|---|---|---|---|
| 5,537,573 A | 7/1996 | Ware et al. | |
| 6,199,142 B1 | 3/2001 | Saulsbury et al. | |
| 7,836,259 B1 | 11/2010 | Filippo et al. | |
| 8,200,905 B2 | 6/2012 | Bell et al. | |
| 9,280,474 B2 | 3/2016 | Pavlou et al. | |
| 9,304,773 B2 | 4/2016 | Scott et al. | |
| 9,910,785 B2 | 3/2018 | Hooker et al. | |
| 2005/0188276 A1* | 8/2005 | Hunter | G06F 11/3409 714/39 |

(Continued)

FOREIGN PATENT DOCUMENTS

| | | | | |
|---|---|---|---|---|
| CN | 105701034 B | 6/2019 | | |
| EP | 2 015 189 | * | 1/2009 | G06F 12/08 |

OTHER PUBLICATIONS

Taiwanese Notice of Allowance dated Feb. 22, 2024, issued in corresponding Taiwanese Patent Application No. 109132190 (4 pages).

*Primary Examiner* — Gurtej Bansal
(74) *Attorney, Agent, or Firm* — Lewis Roca Rothgerber Christie LLP (57) ABSTRACT

Provided is a method of adjusting prefetching operations, the method including setting a prefetching distance, accessing a prefetching-trigger key, determining a target key is outside of the prefetching distance from the prefetching-trigger key, increasing the prefetching distance, and successfully fetching a subsequent target key of a subsequent prefetching-trigger key from a prefetching read-ahead buffer.

11 Claims, 5 Drawing Sheets

(56) References Cited

U.S. PATENT DOCUMENTS

| | | | |
|---|---|---|---|
| 2009/0055595 A1* | 2/2009 | Gill | G06F 12/0862 |
| | | | 711/E12.072 |
| 2010/0250854 A1 | 9/2010 | Ju | |
| 2011/0213924 A1 | 9/2011 | Ledford | |
| 2011/0264898 A1* | 10/2011 | Chaudhry | G06F 9/3863 |
| | | | 712/228 |
| 2015/0039839 A1* | 2/2015 | LeMire | G06F 12/0893 |
| | | | 711/138 |
| 2015/0134933 A1 | 5/2015 | Holm et al. | |
| 2020/0167286 A1 | 5/2020 | Carlson | |

* cited by examiner

PREFETCHING OPERATIONS IN STORAGE DEVICES

CROSS-REFERENCE TO RELATED APPLICATION(S)

This application is a continuation of U.S. patent application Ser. No. 16/887,567, filed May 29, 2020, which claims priority to, and the benefit of, U.S. Provisional Application Ser. No. 62/903,642, filed on Sep. 20, 2019, entitled "Performance Aware Prefetching", the entire contents of both of which are incorporated herein by reference.

FIELD

Embodiments of the present disclosure relate generally to data storage and data retrieval as relating to prefetching operations in a storage device.

BACKGROUND

Prefetching is the process of transferring data from main memory (e.g., the KV device) to temporary storage (e.g., to cache memory) such that the transferred data may be ready for later use. Prefetching may be used because data may generally be accessed more quickly from the temporary storage than from the slower main memory. That is, prefetching may be used to speed up fetch operations by beginning a fetch operation having a result that is expected to be needed relatively soon.

Prefetching operations in storage systems can be useful in increasing a sequential access pattern for data, where the data is read, processed, and written out with incremented/decremented addressing. For example, sequential access performed using key-value solid state drives (KVSSDs) may be improved by using prefetching operations. However, if prefetching operations are performed without considering the I/O pattern to a given storage system (e.g., without considering whether the I/O pattern is sequential or random), then the prefetching operations may burden the system, or may waste input-output (I/O) bandwidth, thereby negatively affecting system performance. For example, a prefetching request, in itself, may add I/O burden to the system.

The above information disclosed in this Background section is only for enhancement of understanding of the background of the disclosure, and therefore may contain information that does not form the prior art.

SUMMARY

Embodiments described herein provide improvements to data storage and retrieval.

According to one embodiment of the present disclosure, there is provided a method of adjusting prefetching operations, the method including setting a prefetching distance, accessing a prefetching-trigger key, determining a target key is outside of the prefetching distance from the prefetching-trigger key, increasing the prefetching distance, and successfully fetching a subsequent target key of a subsequent prefetching-trigger key from a prefetching read-ahead buffer.

The method may further include determining the additional subsequent prefetching-trigger key is missing from the prefetching read-ahead buffer, and skipping a prefetching operation for an additional subsequent target key of an additional subsequent prefetching-trigger key.

The method may further include decreasing the prefetching distance.

Decreasing the prefetching distance may include decreasing the prefetching distance by one key.

Increasing the prefetching distance may include increasing the prefetching distance exponentially.

The method may further include determining that the prefetching read-ahead buffer has overflown, and inserting an entry corresponding to an additional subsequent prefetching-trigger key into a cache of a key-value database.

The method may further include determining the subsequent prefetching-trigger key is present in the simulation cache, and reinitiating prefetching operations.

According to another embodiment of the present disclosure, there is provided a system for managing prefetching operations for transferring data from a storage device to a prefetching read-ahead buffer, the system being configured to set a prefetching distance, access a prefetching-trigger key, determine a target key is outside of the prefetching distance from the prefetching-trigger key, increase the prefetching distance, and successfully fetch a subsequent target key of a subsequent prefetching-trigger key from the prefetching read-ahead buffer.

The system may be further configured to determine the additional subsequent prefetching-trigger key is missing from the prefetching read-ahead buffer, and skip a prefetching operation for an additional subsequent target key of an additional subsequent prefetching-trigger key.

The system may be further configured to decrease the prefetching distance.

The system may be configured to decrease the prefetching distance by decreasing the prefetching distance by one key.

The system may be configured to increase the prefetching distance by increasing the prefetching distance exponentially.

The system may be further configured to determine that the prefetching read-ahead buffer has overflown, and insert an entry corresponding to an additional subsequent prefetching-trigger key into a cache of a key-value database of the system.

The system may be further configured to determine the subsequent prefetching-trigger key is present in the simulation cache, and reinitiate prefetching operations.

According to yet another embodiment of the present disclosure, there is provided a non-transitory computer readable medium implemented on a system for managing prefetching operations for transferring data from a storage device to a prefetching read-ahead buffer, the non-transitory computer readable medium having computer code that, when executed on a processor, implements a method of adjusting prefetching operations, the method including setting a prefetching distance, accessing a prefetching-trigger key, determining a target key is outside of the prefetching distance from the prefetching-trigger key, increasing the prefetching distance, and successfully fetching a subsequent target key of a subsequent prefetching-trigger key from a prefetching read-ahead buffer.

The computer code, when executed on a processor, may further implement the method of adjusting prefetching operations by determining the additional subsequent prefetching-trigger key is missing from the prefetching read-ahead buffer, and skipping a prefetching operation for an additional subsequent target key of an additional subsequent prefetching-trigger key.

The computer code, when executed on a processor, may further implement the method of adjusting prefetching operations by decreasing the prefetching distance.

The computer code, when executed on a processor, may be configured to increase the prefetching distance by increasing the prefetching distance exponentially.

The computer code, when executed on a processor, may further implement the method of adjusting prefetching operations by determining that the prefetching read-ahead buffer has overflown, and inserting an entry corresponding to an additional subsequent prefetching-trigger key into a cache of a key-value database.

The computer code, when executed on a processor, may further implement the method of adjusting prefetching operations by determining the subsequent prefetching-trigger key is present in the simulation cache, and reinitiating prefetching operations.

Accordingly, the system of embodiments of the present disclosure is able to improve data storage and retrieval by providing a prefetching mechanism, the aggressiveness of which may be adjusted based upon a degree to which a corresponding burden is placed on the system as a result of prefetching operations and/or may be adjusted based upon a degree to which the prefetching operations are effective.

DETAILED DESCRIPTION

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Some read-ahead mechanisms do not take care of a read-ahead status. Instead, a read-ahead operation is triggered only when accessing either a missing page or a marked-as-read page (e.g., a page marked as "PG_readahead"). Accordingly, some read-ahead mechanisms simply ramp up prefetching distance to increase the size of prefetching windows until system congestion is detected (e.g., detected using the PG_readahead indicator). Also, some read-ahead mechanisms are unconcerned with whether pages are retrieved from a prefetching read-ahead buffer or elsewhere, and simply mark the read-ahead/PG_readahead indicator for any new asynchronous read-ahead trigger.

Accordingly, there may be some benefit to system operation by using a prefetching control mechanism, and by automatically identifying the I/O access pattern.

A key-value (KV) device, such as a key-value solid state drive (KVSSD), implements an object-like storage scheme on the device, as opposed to reading and writing data blocks as requested by a host server or storage array controller. The KV device effectively has an Object Translation Layer (OTL) that may convert between object KV pairs and the native blocks of the KV device. Also, a KVSSD may provide a KV interface at a device level, thereby providing improved performance and simplified storage management. This can, in turn, enable high-performance scaling, the simplification of a conversion process (e.g., data conversion between object data and block data), and the extension of drive capabilities. By incorporating a KV store logic within the firmware of a KVSSD, such KVSSDs are able to respond to direct data requests from an application while reducing involvement of host software. Such KVSSDs may further use SSD hardware that can be augmented by using a Flash Translation Layer (FTL) software for providing processing capabilities.

As mentioned above, prefetching may be used to speed up fetch operations by beginning a fetch operation having a result that is expected to be needed relatively soon. However, prefetching may generally occur before it is known what data will be needed. Accordingly, there may be a risk of wasting time and resources by prefetching data that will ultimately not be used. That is, the benefit that may be obtained from being able to quickly access data from temporary storage may be offset by system overhead that may be associated with transferring data from the main memory to the temporary storage if much of the transferred data is not accessed from the temporary storage. Accordingly, as described below, a prefetching policy may seek to only prefetch data that is expected to be retrieved from the temporary storage in the relatively near future.

Embodiments of the present disclosure provide improved methods of data storage and retrieval by reducing prefetching activity when prefetching operations unnecessarily increase system burden, and by increasing prefetching activity when the extent of prefetching operations is ineffective. That is, described below is a performance-aware prefetching technique that includes setting a prefetching distance for prefetching a corresponding amount of data (e.g., repeatedly), analyzing system performance to decide as to whether the prefetching distance is not sufficiently large enough or, contrastingly, is larger than a useful size, and then adjusting the prefetching distance based on the determination.

The performance-aware prefetching technique may be capable of resolving issues relating to system resources or I/O bandwidth that may arise during prefetching operations for prefetching data in a key-value (KV) system. Such problems associated with prefetching operations may be resolved by adapting a prefetching distance of one or more prefetching group windows, and by implementing a simulation cache that allows for each key that is a prefetching operation candidate to be tracked even if the data is not submitted due to a prefetching request buffer being full. That is, the simulation cache may be used without submitting any "actual" prefetching request, thereby reducing the number of I/O requests.

Figure 1:
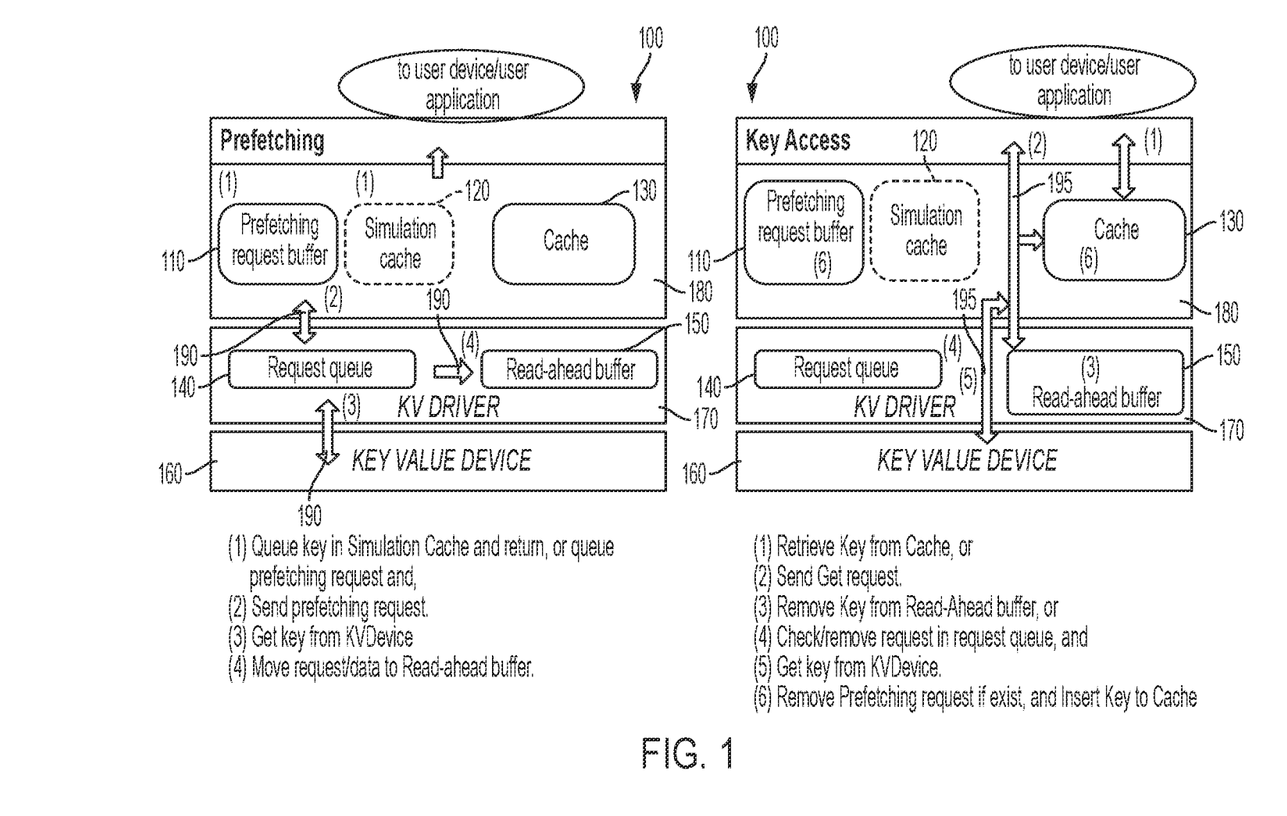
FIG. 1 shows a block diagram depicting a system capable of performance-aware prefetching and key access, according to embodiments of the present disclosure.
Figure 2A:
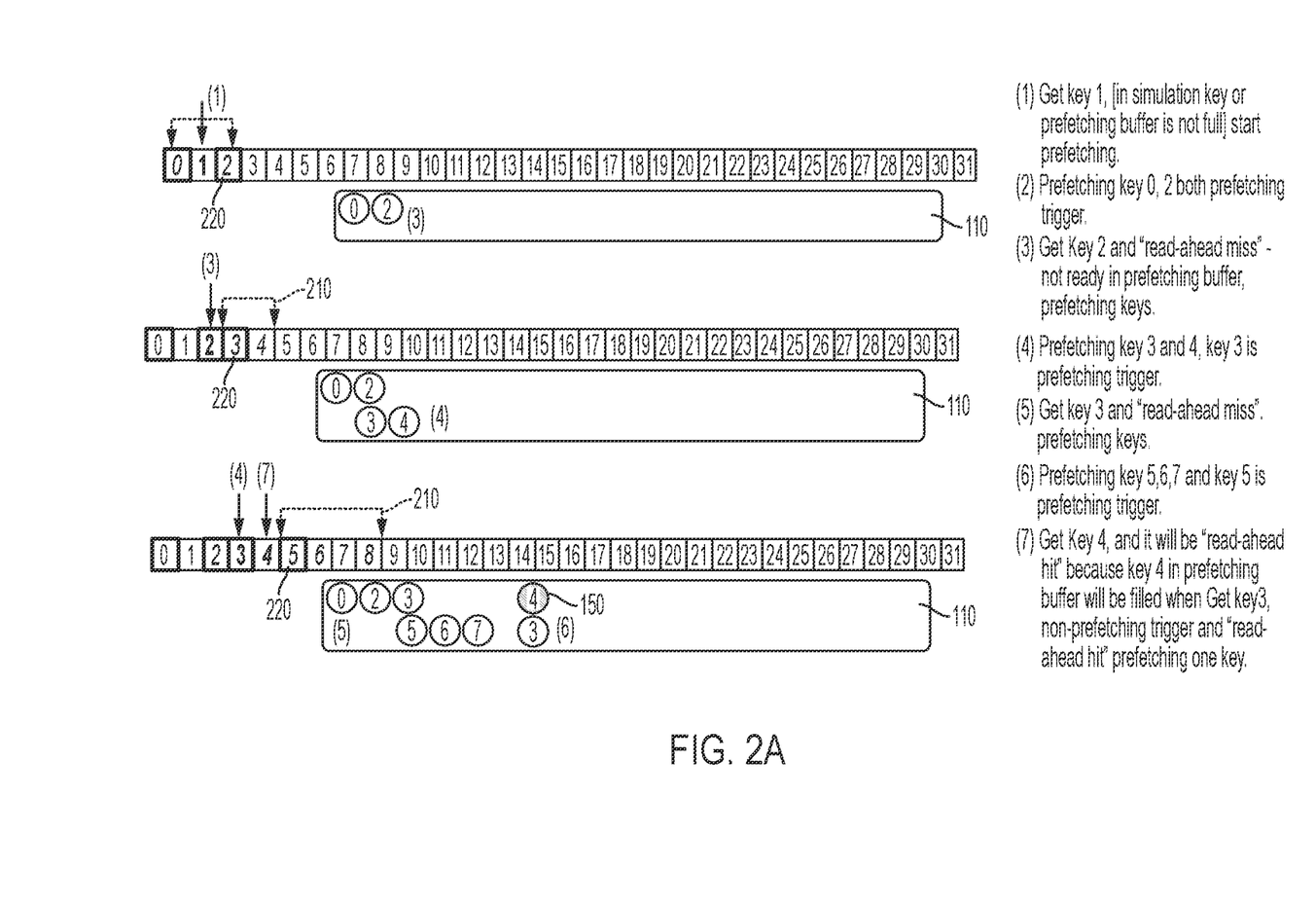
FIGS. 2A and 2B show block diagrams depicting methods of increasing, maintaining, and decreasing a prefetching distance, according to embodiments of the present disclosure.
Figure 2B:
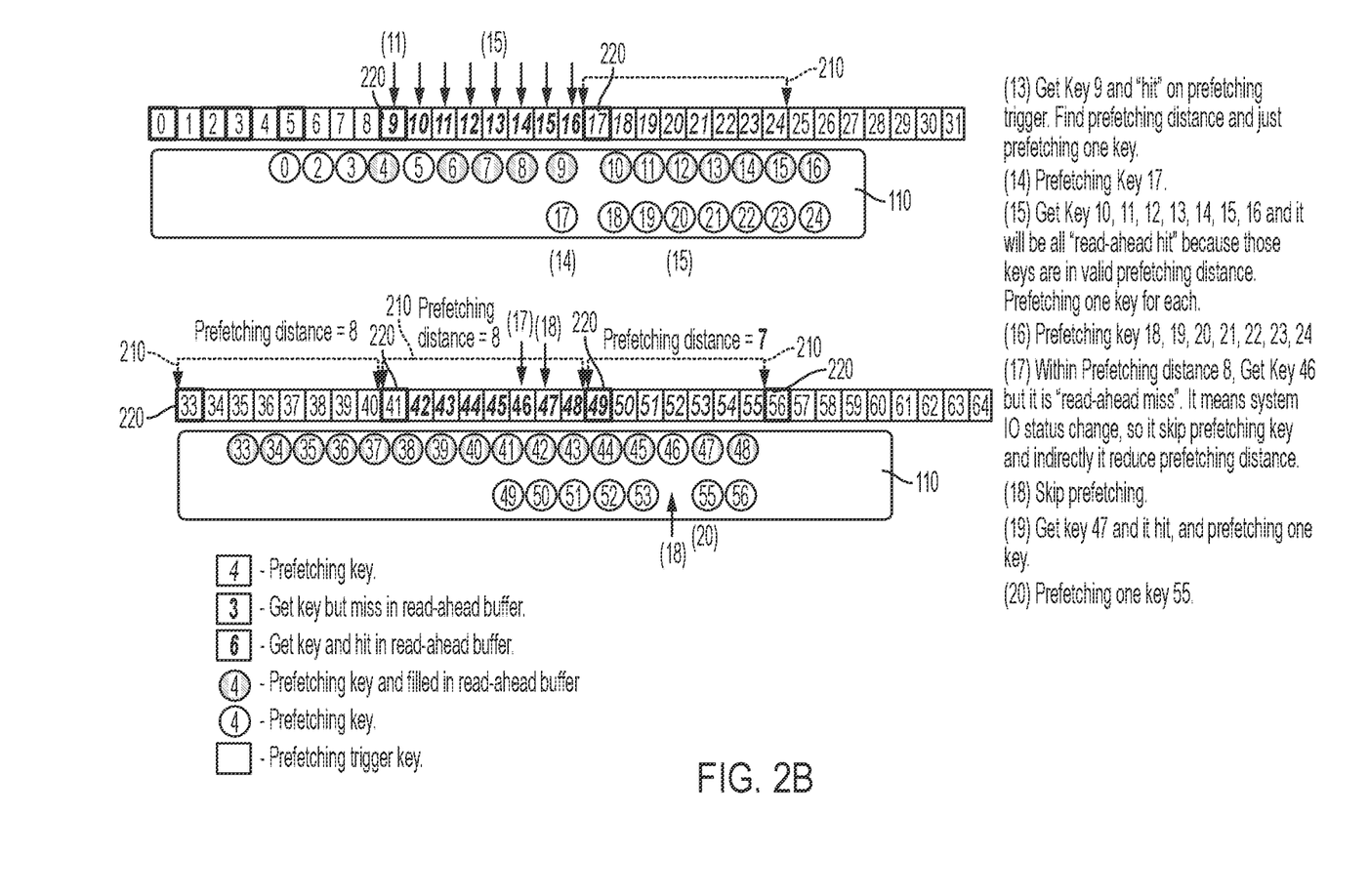

FIG. 1 is a block diagram depicting a system capable of performance-aware prefetching and key access, according to embodiments of the present disclosure. FIGS. 2A and 2B are block diagrams depicting methods of increasing, maintaining, and decreasing a prefetching distance, according to embodiments of the present disclosure. The methods depicted in FIGS. 2A and 2B may be implemented using the system depicted in FIG. 1.

Referring to FIGS. 1, 2A, and 2B, a prefetching window size/prefetching distance 210 determines how much data is prefetched in a single prefetching operation, wherein the longer the prefetching distance 210, the larger the amount of data that is retrieved from storage to be placed in cache memory during the prefetching operation. The size of the prefetching distance 210 may be adjusted by considering a combination of system performance (e.g., system performance of a key-value system 100 including a KV device 160/main memory, a KV driver 170, and a KV database 180 including cache memory 130, as described further below), and a prefetching hit ratio (e.g., a determined rate at which a target data is found within prefetched data, wherein the amount of data that is prefetched is determined by the prefetching distance 210).

For example, if target data is not found within the prefetched data, generally, the prefetching distance 210 may be increased (e.g., may be increased exponentially, linearly, incrementally, or otherwise) such that the amount of prefetched data is increased in subsequent prefetching operations. However, as described with reference to FIG. 2B, if system performance begins to suffer, or if prefetching operations fail to obtain the desired benefit, the prefetching distance 210 may be decreased, or prefetching operations may be skipped.

According to some embodiments, the KV system 100 may initially determine what is expected to be an effective prefetching distance 210. That is, the KV system 100 may determine how far ahead prefetching will occur for a group (e.g., will the prefetching distance be 512 bytes, etc.). For simplicity of description, relatively small prefetching distances 210 are used for the examples described below (e.g., prefetching distances of 1 key to 8 keys).

The KV system 100 may determine that the prefetching distance 210 is effective when the KV system 100 is able to fetch a "read value"/read data corresponding to a prefetching-trigger key 220 within the prefetching distance 210 (e.g., is able to fetch the read value either from a value cache 130 of a KV database 180 of the KV system 100 or from a prefetching buffer/prefetching read-ahead buffer 150 of a KV driver 170 of the KV system 100).

As used herein, a prefetching-trigger key 220 is a key that is at the beginning of a given prefetching window, the size of the prefetching window being equal to the prefetching distance 210. The prefetching-trigger key 220 acts as a trigger to increase the prefetching distance 210 depending on whether the read value is able to be successfully prefetched.

If the prefetching distance 210 is determined to be ineffective (e.g., if the read value corresponding to the prefetching-trigger key 220 is not within the prefetching distance 210), the KV system 100 may increase the prefetching distance 210 until an effective prefetching distance 210 is determined.

Accordingly, if target data is fetched from the prefetching read-ahead buffer 150, the KV system 100 may determine that a "hit" has occurred. The KV system 100 may then mark the prefetching distance 210 as a "find-effective" prefetching distance. Thereafter, as long as a hit occurs for each subsequently accessed target key, the prefetching distance 210 may be maintained at the find-effective prefetching distance 210. However, if the target data corresponding to a prefetching-trigger key 220 is not able to be fetched from the prefetching read-ahead buffer 150 using the prefetching distance 210, the KV system 100 may determine that a "miss" has occurred, and the prefetching distance 210 may be increased.

Thereafter, the KV system 100 will send only one read-ahead request to prefetch a target key for any subsequent accessed key, the target key being at a distance from the accessed key that is equal to the prefetching distance 210. A read-ahead request is an I/O request to asynchronously prefetch multiple pages in the buffer (e.g., the prefetching read-ahead buffer 150) in anticipation that the prefetched pages will be needed relatively soon (e.g., needed by a user application connected to the KV system 100).

Referring to FIG. 2A, in the present example, a first key (e.g., KEY1 marked as "1" in FIG. 2A) may be initially accessed to begin prefetching operations (see operation (1)). The KV system 100 then checks a "cached" flag associated with KEY1 to determine whether the read value corresponding to KEY1 exists in the value cache 130.

If KEY1 is not cached in the value cache 130, then the KV system 100 checks a "prefetched" flag to see whether a request corresponding to the requested key, KEY1, exists in the prefetching request queue/prefetching request buffer 110 of the KV database 180.

If KEY1 is in neither the value cache 130 nor the prefetching request buffer 110 of the KV database 180, the KV system 100 submits a read request (e.g., a "Read(get) request") for the requested key, KEY1, via a synchronous I/O path 195, the synchronous I/O path 195 being between a corresponding KV device 160 (e.g., a KVSSD device) and the KV database 180.

Then, the "read value" corresponding to KEY1 is inserted into the value cache 130 from the KV device 160, and the "cached" flag of KEY1 is changed to indicate that the data corresponding to KEY1 is cached.

Thereafter, a prefetching request is submitted for each of a key immediately preceding the accessed key, and a key immediately following the accessed key (e.g., keys immediately before and after KEY1). That is, a prefetching request is submitted in both the forward and backward directions. Accordingly, in the present example, a prefetching request is submitted for keys KEY0 and KEY2 (see operation (2)), and both KEY0 and KEY2 are treated as prefetching-trigger keys 220.

Requests for the data corresponding to KEY0 and KEY2 are entered into the prefetching request buffer 110, and KEY0 and KEY2 are flagged as prefetched by the associated "prefetched" flags (e.g., either after the prefetching requests for KEY0 and KEY2 are submitted, or prior to the submission of the Read(get) request for KEY1). Then, requests for the data corresponding to KEY0 and KEY2 proceed to the asynchronous request queue 140 via an asynchronous I/O path 190 (e.g., an asynchronous I/O path 190 between the KV driver 170 and the KV database 180).

Then, a copy of the value of KEY1 is returned to the user device/user application from the value cache 130.

Next, either KEY0 (backward direction) or KEY2 (forward direction) may be accessed according to a direction in which the keys are accessed (e.g., by the user application). In the present example, KEY2 is accessed by sending a "Read(get) request" for KEY2 (see operation (3)). The KV system 100 then checks the flags (i.e., the "cached" flag and the "prefetched" flag) associated with KEY2 to determine whether KEY2 is cached in the value cache 130 or prefetched in the prefetching request buffer 110.

Because KEY2 has been prefetched such that a request associated with KEY2 is located in the prefetching request buffer 110, the Read(get) request is submitted to the KV device 160 via a synchronization I/O path between the KV database 180 and the KV device 160 for KEY2.

The KV driver 170 then checks both the prefetching read-ahead buffer 150 and the asynchronous request queue 140 to determine whether a request corresponding to KEY2 exists therein. Because KEY2 is indicated in the asynchronous request queue 140, the KV driver 170 cancels the pending asynchronous request corresponding to KEY2 from the asynchronous request queue 140, and instead submits a synchronous request corresponding to KEY2 via the synchronous I/O path 195.

The KV driver 170 then returns the read value associated with KEY2. Because KEY2 was not in the value cache 130, the read value of KEY2 is returned with a "read-ahead miss" flag (e.g., via the synchronous I/O path 195). Then, KEY2 is migrated from the KV device 160 to the value cache 130.

Accordingly, the KV database 180 is aware that the requested key (KEY2) has been prefetched, but the read-ahead request has failed. Accordingly, the prefetching distance 210 may be increased (e.g., to a prefetching distance 210 of two keys in the present example, although the extent to which the prefetching distance 210 is increased is not limited, and may be different in other embodiments), and one or more flags may be set for the prefetching keys (e.g., a flag indicating whether a key is a prefetching-trigger key, and/or a flag indicating that the keys are being read in a forward or backward direction).

With the prefetching distance 210 having been increased to two keys, KEY3 and KEY4 are prefetched, KEY3 being the prefetching-trigger key 220 (i.e., the first key of the two keys corresponding to the prefetching distance 210, see operation (4)).

Requests corresponding to KEY3 and KEY4 are then placed in the prefetching request buffer 110, and are then submitted via the asynchronous I/O path 190 (e.g., between the prefetching request buffer 110 and the asynchronous request queue 140) to be placed in the asynchronous request queue 140. Then, as with KEY2, the KV driver 170 submits a Read(get) request for KEY3 via the synchronous I/O path 195, and cancels KEY3 from the asynchronous request queue 140.

Then, a copy of the value associated with KEY3 is submitted from the KV device 160 to the value cache 130 via the synchronous I/O path 195, along with a "read-ahead miss" flag (see operation (5)). As before, because KEY3 is a prefetching-trigger key 220, the prefetching distance 210 may be increased again because of the "read-ahead miss" flag. In the present example, the prefetching distance 210 is increased to four keys (e.g., the prefetching distance 210 is doubled). However, it should be noted that the degree to which the prefetching distance 210 is increased is not limited, and may be increased further (e.g., incrementally) in other examples.

In the present example, KEY5, KEY6, and KEY7 are then prefetched, with KEY5 being the prefetching-trigger key 220 due to KEY5 being the first key of the three keys corresponding to the prefetching distance 210 (see operation (6)).

KEY4 may then be accessed, thereby resulting in a hit due to KEY4 being located in the prefetching read-ahead buffer 150 from when KEY3 was accessed (see operation (7)). That is, the Read(get) request for KEY4 is submitted via the synchronous I/O path 195, and the KV driver 170 checks both the asynchronous request queue 140 and the prefetching read-ahead buffer 150, thereby resulting in a hit due to KEY4 being identified in the prefetching read-ahead buffer 150.

Thereafter, an asynchronous request is submitted to the KV device 160 by the KV driver 170 via the asynchronous I/O path 190, and KEY0, KEY4, KEY5, KEY6, and KEY7 are retrieved from the KV device 160, and are placed in the prefetching read-ahead buffer 150 via the asynchronous I/O path 190.

Then, the value associated with KEY4 is returned to the user application/user device along with the "read-ahead hit" flag. KEY4 is then migrated from the prefetching read-ahead buffer 150 to the value cache 130 via the synchronous I/O path 195, and is removed from the prefetching read-ahead buffer 150. KEY4 is then flagged as cached.

Because a "read-ahead hit" is determined during the access of KEY4, and because KEY4 is not a prefetching-trigger key, one additional key, KEY 8, is prefetched at the same prefetching distance of four keys (see operation (8)). That is, prefetching of KEY8 occurs such that KEY8 passes from the prefetching request buffer 110 to the asynchronous request queue 140 via the asynchronous I/O path 190, and the flag of requested KEY8 is inherited to the prefetch target (e.g., a trigger flag to increase prefetching distance 210, thereby marking KEY8 as the prefetching-trigger key 220).

Moving forward, a Read(get) request is submitted for KEY 5 (see operation (9)). KEY9, like KEY8, is submitted to the prefetching request buffer 110 and then to the asynchronous request queue 140 via the asynchronous I/O path 190. Accordingly, a "read-ahead miss" flag associated with KEY5 is returned as KEY5 is not located in the prefetching read-ahead buffer 150. Then, KEY9, KEY10, KEY11, KEY12, and KEY13 are prefetched to be placed in the prefetching request buffer 110 (see operation (10)).

Thereafter, accesses of KEY6, KEY7, and KEY8, which correspond to a Read(get) request that is submitted for each, results in a hit because the prefetching read-ahead buffer 150 is previously filled with KEY6, KEY7, and KEY8 upon access of KEY5 resulting from the Read(get) request for KEY5 (see operation (11)). Because the accesses of each of KEY6, KEY7, and KEY8 have resulted in a hit, the prefetching distance 210 may remain unchanged, and KEY14, KEY15, and KEY16 are then prefetched to the prefetching request buffer 110 (see operation (12)).

Referring now to FIG. 2B, KEY9 is accessed as a prefetching-trigger key 220, and a hit occurs due to KEY9 being in the prefetching read-ahead buffer 150 as a result of the access of KEY5 (see operation (13)). The prefetching distance 210 remains unchanged, and a single key, KEY17, is thereafter prefetched (see operation (14)).

Then, KEY10, KEY11, KEY12, KEY13, KEY14, KEY15, and KEY16 are accessed in order, all of which being indicated as a hit due to these keys being within a valid prefetching distance 210 (i.e., being located in the prefetching read-ahead buffer 150, see operation (15)). Accordingly, another subsequent key is prefetched as a result of the Read(get) request for each of KEY10, KEY11, KEY12, KEY13, KEY14, KEY15, and KEY16, respectively, such that KEY18, KEY19, KEY20, KEY21, KEY22, KEY23, and KEY24 are all prefetched to be placed in the prefetching request buffer 110 (see operation (16)).

In the example described above, the prefetching distance 210 is increased at an increasing rate. For example, the KV system 100 may initially set the prefetching distance 210 to cover two consecutive keys. Then, when the prefetching-trigger key 220 fails to retrieve the target key from the prefetching read-ahead buffer 150, thereby indicating a miss, the KV system 100 may then double the prefetching distance 210 to cover four consecutive keys. And when the prefetching-trigger key 220 fails to retrieve the target key from the prefetching read-ahead buffer 150 again, the KV system 100 may then double the prefetching distance 210 to cover eight consecutive keys. However, the embodiments of the present disclosure are not so limited (e.g., the prefetching distance 210 may be linearly increased).

As shown in FIG. 2B, once the prefetching distance 210 is increased such that the target key is effectively fetched (i.e., once the KV system 100 finds an effective prefetching distance 210 for a subsequently accessed prefetching-trigger key 220), the KV system 100 may set a "prefetching count" to 1. Then, the prefetching distance 210 may be maintained for a period of time thereafter (e.g., for target keys KEY17, KEY25, KEY33, and KEY41).

However, as shown in FIG. 2B, in other scenarios, the KV system 100 of embodiments of the present disclosure may decrease the prefetching distance 210 when suitable. For example, once an effective prefetching distance 210 is set, if an attempt to read a key from the prefetching read-ahead buffer 150 fails following the access of a key that is other than the prefetching-trigger key 220 (e.g., for a key that is other than the first key of the prefetching window after the prefetching distance 210 is adjusted), the KV system 100 may determine that the I/O load of the KV system 100 has changed, and that the effective prefetching distance 210 is larger than suitable to fill the prefetching key to the prefetching read-ahead buffer 150 without burdening the KV system 100. Accordingly, to reduce system I/O load, the KV system 100 may then skip prefetching for that key, and a subsequent key's prefetching key pointer will be changed by reducing the prefetching distance 210 (e.g., by reducing the previous prefetching distance 210 by one or more).

In the example shown in FIG. 2B, KEY46 is accessed, but a prefetching miss is indicated, thereby indicating that the system I/O status of the KV system 100 has changed (see operation (17)). Accordingly, the KV system 100 stops prefetching operations, and skips prefetching any keys until the next key access, thereby reducing the prefetching distance 210 (e.g., reducing the prefetching distance 210 from eight keys to seven keys, see operation (18)).

Because prefetching operations are paused, once KEY47 is accessed, and a hit is indicated as a result of KEY47 being filled in the prefetching read-ahead buffer 150 (see operation (19)), prefetching operations are resumed, and one additional key, KEY55, is prefetched (see operation (20)).

Accordingly, subsequent to finding an effective prefetching distance 210, if fetching from the prefetching read-ahead buffer 150 fails more frequently (e.g., if there is an increase in the rate of misses), the KV system 100 may determine that the prefetching distance 210 is too large, thereby potentially causing the prefetching read-ahead buffer 150 to overflow. Accordingly, the KV system 100 may determine that the KV system 100 is overloaded by I/O requests, and may then decide to cease prefetching operations to avoid unnecessary burden to the KV system 100. Such a situation may occur when operations of an application changes such that an I/O access pattern shifts from a sequential access pattern to a random access pattern. That is, when the I/O access pattern corresponds to a random access pattern, the prefetching read-ahead buffer 150 will generally continue to fill until it is full or overflows.

According to embodiments of the present disclosure, the KV system 100 may use a simulation cache/virtual simulation cache (e.g., a cache) 120 (see FIG. 1) to determine whether the I/O access pattern has changed or not. Accordingly, the KV system 100 may begin prefetching operations, and may manage a buffer with the simulation cache 120, which may act as a virtual cache. When an overflow of the prefetching read-ahead buffer 150 occurs, the KV system 100 may stop sending prefetching request to the KV device 160, and may instead insert the key in the simulation cache 120.

That is, the KV system 100 of the disclosed embodiments may be effectively capable of random access pattern detection. Because prefetching operations are not generally useful for a random access pattern, the KV system 100 may determine that the I/O access pattern is random when the prefetching request buffer 110 is full. If a random access pattern is determined, the KV system 100 may cease prefetching for newly accessed keys that are neither in the value cache 130, nor located in the prefetching read-ahead buffer 150.

Accordingly, when suitable, the KV system 100 may use the simulation cache 120 instead of using the physical prefetching request buffer 110. In some embodiments, the size of the simulation cache 120 is the same as the prefetching request buffer 110 size. However, unlike the prefetching request buffer 110, use of the simulation cache 120 does not result in the submission of any actual request to the KV driver 170. Further, if the simulation cache 120 is full, the KV system 100 may simply evict the oldest key instead of stopping prefetch operations.

By using the simulation cache 120, the KV system 100 may generate a simulation cache number in sequentially ascending order for each key that is a prefetching operation candidate even if the data is not submitted to the KV device 160 due to the prefetching request buffer 110 being full, thereby reducing the number of I/O requests.

Contrastingly, for a sequential access pattern, if a hit occurs in the prefetching request buffer 110, the mechanism of the KV system 100 evicts the hit key, and thereafter inserts a new key, such that the prefetch size may be kept under the effective prefetching distance 210. As described herein, every new key access that is neither cached, nor prefetched, has its own prefetching distance 210. Accordingly, and for example, when a thread has two sequential access streams, each access stream may have its own prefetching distance 210.

Accordingly, when prefetching restarts after the stopping of the prefetching operations (e.g., when the I/O access pattern of the application changes from random back to sequential), and when a miss occurs thereafter, the KV system 100 may check the availability of the prefetching read-ahead buffer 150, and a current key's simulation number may be inserted into prefetching read-ahead buffer 150 from the simulation cache 120. Then, the KV system 100 may reinitiate prefetching operations with the prefetching group.

That is, if a prefetch hit occurs in the simulation cache 120 (e.g., when the I/O access pattern has changed from random to sequential), the KV system 100 may cease using the simulation cache 120, and may restart actual prefetching operations by using the prefetching read-ahead buffer 150, such that the oldest key in prefetching request buffer 110 is evicted, and a newly prefetched key is inserted. When a hit is determined to occur in the simulation cache 120, it may be presumed that a hit would have occurred in the prefetching read-ahead buffer 150 if the data would have been prefetched. Accordingly, when the KV system 100 reads a key, and is able to find the key in the simulation cache 120, the KV system 100 may determine that a new sequential access pattern has occurred, and may begin prefetching operations again.

If there is no available room in the prefetching read-ahead buffer 150, the KV system 100 may simply set the simulation number to the key in the simulation cache 120. Again, the prefetching distance 210 will increase when a prefetching miss associated with a prefetching-trigger key 220 occurs.

According to the example above, the KV system 100 will generally perform prefetching operations, and will send the prefetching request to the KV device 160, until the prefetching read-ahead buffer 150 overflows. Once the prefetching read-ahead buffer 150 overflows, the KV system 100 determines that the I/O access pattern has changed to a random access pattern, and then disables prefetching operations to reduce burden to the KV system 100.

When the KV system 100 stops prefetching for the prefetching read-ahead buffer 150, the KV system 100 awaits a new request for the prefetching read-ahead buffer 150 while using the simulation cache 120 instead of using the prefetching read-ahead buffer 150. When using the simulation cache 120 during suspension of prefetching operations, the KV system 100 may evict the oldest request in the simulation cache 120 to allow room for any new request. Then, when a hit occurs in the simulation cache 120, the KV system 100 may assume that the I/O access pattern has shifted back to a sequential access pattern, and may begin prefetching operations again.

Performance-aware prefetching according to the embodiments disclosed above may be summarized as follows. The KV system 100 may adjust a read-ahead request count based on system status. A read-ahead miss for prefetching-trigger keys 220 indicates that the prefetching distance 210 is too small, and the KV system may increase the prefetching distance 210 by sending a greater number of prefetched keys. A read-ahead hit for a prefetching-trigger key 220 results in sending only one prefetching request. A read-ahead miss for non-trigger keys (i.e., keys other than the prefetching-trigger keys 220) indicates that the KV system 100 is in an I/O congestion status, and the KV system 100 may reduce the prefetching distance 210 by skipping the next prefetching request. When the prefetching read-ahead buffer 150 is full, prefetching keys are added simulation cache 120, and if a key is found in the simulation cache 120, thereby indicating a sequential I/O pattern, the KV system 100 may restart prefetching operations.

Figure 3:
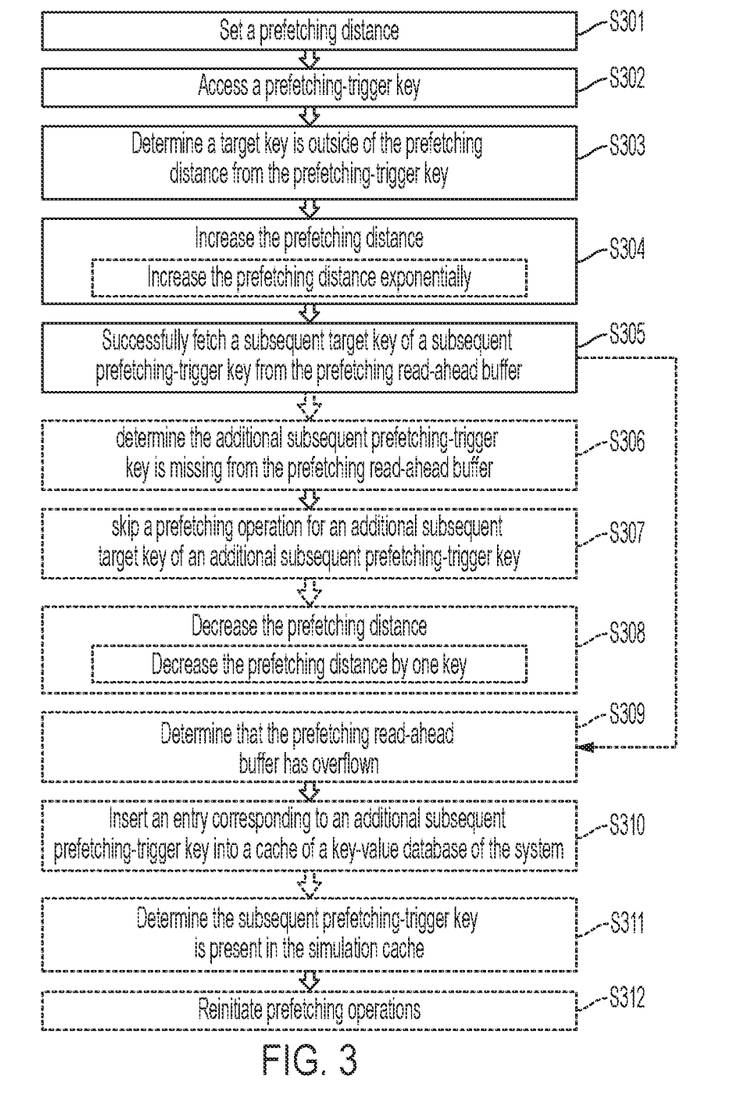
FIG. 3 shows a flowchart depicting a method for prefetching data according to some embodiments of the present disclosure.

FIG. 3 shows a flowchart depicting a method for prefetching data according to some embodiments of the present disclosure.

Referring to FIG. 3, at S301, a system of embodiments of the present disclosure (e.g., the KV system 100) may set a prefetching distance. At S302, the system may access a prefetching-trigger key. At S303, the system may determine a target key is outside of the prefetching distance from the prefetching-trigger key. At S304, the system may increase the prefetching distance. The prefetching distance may be increased exponentially.

At S305, the system may successfully fetch a subsequent target key of a subsequent prefetching-trigger key from the prefetching read-ahead buffer.

At S306, the system may determine the additional subsequent prefetching-trigger key is missing from the prefetching read-ahead buffer. At S307, the system may skip a prefetching operation for an additional subsequent target key of an additional subsequent prefetching-trigger key.

At S308, the system may decrease the prefetching distance. The prefetching distance may be decreased by one key.

At S309, the system may determine that the prefetching read-ahead buffer has overflown. At S310, the system may insert an entry corresponding to an additional subsequent prefetching-trigger key into a cache of a key-value database of the system.

At S311, the system may determine the subsequent prefetching-trigger key is present in the simulation cache. At S312, the system may reinitiate prefetching operations.

More comprehensively, performance-aware prefetching operations in which the prefetching distance is incrementally increased may occur by performing the following operations, noting that some of the following operations are optional. Accessing a prefetching-trigger key as a first key. Determining whether the first key is cached in a value cache of a key-value database. Determining whether a first prefetching request for the first key is in a prefetching request buffer of the key-value database when the first key is not cached in the value cache. Submitting a first read request for the first key to a key-value device when the first key is not cached in the value cache and is not in the prefetching request buffer. Inserting a first read value of the first key returned from the key-value device into the value cache. Marking the first key as cached. Submitting a second prefetching request for a second key that is immediately adjacent the first key. Placing the second prefetching request in the prefetching request buffer, and in an asynchronous request queue of a device driver. Sending the first read value to a user application. Accessing the second key. Determining that the second prefetching request is in the asynchronous request queue. Canceling the second prefetching request from the asynchronous request queue. Submitting a second read request for the second key to the key-value device. Inserting a second read value of the second key returned from the key-value device into the value cache. Canceling the second prefetching request from the prefetching request buffer. Marking the second key as cached. Marking the second key as a read-ahead miss. Increasing a prefetching distance. Returning the second read value to the user application. Submitting a third prefetching request for a third key immediately adjacent the second key, and a fourth prefetching request for a fourth key immediately adjacent the third key. Placing the third prefetching request and the fourth prefetching request in the prefetching request buffer and the asynchronous request queue. Accessing the third key. Determining that the third prefetching request is in the asynchronous request queue. Canceling the third prefetching request from the asynchronous request queue. Submitting a third read request for the third key to the key-value device. Inserting a third read value of the third key returned from the key-value device into the value cache. Canceling the third prefetching request from the prefetching request buffer. Marking the third key as cached. Increasing the prefetching distance. Submitting a fifth prefetching request for a fifth key immediately adjacent the fourth key, and a sixth prefetching request for a sixth key immediately adjacent the fifth key. Placing the fifth prefetching request and the sixth prefetching request in the prefetching request buffer and the asynchronous request queue. Submitting the fourth prefetching request, the fifth prefetching request, and the sixth prefetching request to the key-value device from the asynchronous request queue. Inserting a fourth read value of the fourth key, a fifth read value of the fifth key, and a sixth read value of the sixth key in a prefetching read-ahead buffer of the device driver. Accessing the fourth key. Determining that the fourth read value is in the prefetching read-ahead buffer. Migrating the fourth read value from the prefetching read-ahead buffer to the value cache. Canceling the fourth prefetching request from the prefetching request buffer. Marking the fourth key as cached. Submitting a seventh prefetching request for a seventh key immediately adjacent the sixth key. Placing the seventh prefetching request in the prefetching request buffer and the asynchronous request queue. Accessing the fifth key. Determining that the fifth read value is in the prefetching read-ahead buffer. Migrating the fifth read value from the prefetching read-ahead buffer to the value cache. Canceling the fifth prefetching request from the prefetching request buffer. And marking the fifth key as cached.

Accordingly, embodiments of the present disclosure provide advantages by detecting sequential access patterns in a mixed workload environment. Accordingly, the embodiments are able to adjust the frequency and extent of prefetching operations based on system status, thereby reducing wasted I/O bandwidth by monitoring system performance, thereby improving system performance. Embodiments of the present disclosure may be implemented via a software architecture for improving response time for sequential read operations on a KV device, thereby controlling prefetching request I/O based on system status and improving sequential read I/O performance over the KV device without degradation.

What is claimed is:

1. A method of adjusting caching operations, the method comprising:
   retrieving target data from a buffer of a first cache;
   determining that the buffer of the first cache has overflown;
   pausing a caching operation of the first cache in response to the determining that the buffer of the first cache has overflown such that requests to a memory device that correspond to the caching operation are paused;

inserting an entry comprising a symbol representing additional target data into a second cache;

determining the entry is present in the second cache; and reinitiating the caching operation of the first cache in response to the determining that the entry is present in the second cache.

2. The method of claim 1, further comprising decreasing a caching distance.

3. The method of claim 2, wherein decreasing the caching distance comprises decreasing the caching distance by one key.

4. The method of claim 1, further comprising increasing a caching distance exponentially.

5. A system for managing caching operations for transferring data from a storage device to a cache, the system being configured to:

retrieve target data from a buffer of a first cache;

determine that the buffer of the first cache has overflown;

pause a caching operation of the first cache in response to a determination that the buffer of the first cache has overflown such that requests to a memory device that correspond to the caching operation are paused;

insert an entry comprising a symbol representing additional target data into a second cache;

determine the entry is present in the second cache; and reinitiate the caching operation of the first cache in response to a determination that the entry is present in the second cache.

6. The system of claim 5, wherein the system is further configured to decrease a caching distance.

7. The system of claim 6, wherein the system is configured to decrease the caching distance by one key.

8. The system of claim 5, wherein the system is configured to increase a caching distance exponentially.

9. A non-transitory computer readable medium implemented on a system for managing caching operations for transferring data from a storage device to a cache, the non-transitory computer readable medium having computer code that, when executed on a processor, implements a method of adjusting the caching operations, the method comprising:

retrieving a target data from a buffer of a first cache;

determining that the buffer of the first cache has overflown;

pausing a caching operation of the first cache in response to the determining that the buffer of the first cache has overflown such that requests to a memory device that correspond to the caching operation are paused;

inserting an entry comprising a symbol representing additional target data into a second cache;

determining the entry is present in the second cache; and reinitiating the caching operation of the first cache in response to the determining that the entry is present in the second cache.

10. The non-transitory computer readable medium of claim 9, wherein the computer code, when executed on the processor, further implements the method of adjusting the caching operations by decreasing a caching distance.

11. The non-transitory computer readable medium of claim 9, wherein the computer code, when executed on the processor, implements the method of adjusting the caching operations to increase a caching distance exponentially.

* * * * *